US012469689B2

(12) United States Patent
Kotani et al.

(10) Patent No.: US 12,469,689 B2
(45) Date of Patent: Nov. 11, 2025

(54) SAMPLE SUPPORT BODY, IONIZATION METHOD, AND MASS SPECTROMETRY METHOD

(71) Applicant: HAMAMATSU PHOTONICS K.K., Hamamatsu (JP)

(72) Inventors: Masahiro Kotani, Hamamatsu (JP); Takayuki Ohmura, Hamamatsu (JP); Akira Tashiro, Hamamatsu (JP)

(73) Assignee: HAMAMATSU PHOTONICS K.K., Shizuoka (JP)

(*) Notice: Subject to any disclaimer, the term of this patent is extended or adjusted under 35 U.S.C. 154(b) by 299 days.

(21) Appl. No.: 18/037,383

(22) PCT Filed: Sep. 17, 2021

(86) PCT No.: PCT/JP2021/034404
§ 371 (c)(1),
(2) Date: May 17, 2023

(87) PCT Pub. No.: WO2022/130717
PCT Pub. Date: Jun. 23, 2022

(65) Prior Publication Data
US 2023/0420237 A1 Dec. 28, 2023

(30) Foreign Application Priority Data
Dec. 14, 2020 (JP) ................................ 2020-207048

(51) Int. Cl.
*H01J 49/04* (2006.01)

(52) U.S. Cl.
CPC ................................ *H01J 49/0409* (2013.01)

(58) Field of Classification Search
USPC ........................................................ 250/288
See application file for complete search history.

(56) References Cited

U.S. PATENT DOCUMENTS 11,892,429 B2 * 2/2024 Hutter ...................... G01N 1/42
11,913,861 B2 * 2/2024 Musselman ......... H01J 49/0409
2023/0411133 A1 * 12/2023 Kotani ................ H01J 49/0409

FOREIGN PATENT DOCUMENTS

CN 1500140 A 5/2004
CN 100437114 C 11/2008
CN 110168369 A 8/2019
(Continued)

OTHER PUBLICATIONS

International Preliminary Report on Patentability mailed Jun. 29, 2023 for PCT/JP2021/034404.
(Continued)

*Primary Examiner* — Kiet T Nguyen
(74) *Attorney, Agent, or Firm* — Faegre Drinker Biddle & Reath LLP

(57) ABSTRACT

A sample support body is used for ionizing a component of a sample. The sample support body includes: a substrate; a porous layer provided on the substrate and having a front surface on a side opposite to the substrate; and a partition portion partitioning the front surface into a first region and a second region. The porous layer includes a main body layer having a plurality of holes opening to the front surface. The partition portion includes a partition groove formed on the front surface so as to pass between the first region and the second region.

14 Claims, 11 Drawing Sheets

(56) References Cited

FOREIGN PATENT DOCUMENTS

| | | | |
|---|---|---|---|
| EP | 3686590 | A1 | 7/2020 |
| JP | 2020-136136 | A | 8/2020 |
| WO | 02/077152 | A1 | 10/2002 |
| WO | 2020/202729 | A1 | 10/2020 |

OTHER PUBLICATIONS

"REDIchip™ Resonance-Enhanced Desorption Ionization, https://www.cosmobio.co.jp/product/uploads/document/PTB_REDIchip-Presentation.pdf", Protea Biosciences, Inc. , Oct. 13, 2020.

"Matrix-free Small Molecule Analyses Using REDIchip™ on a MALDI Platform, https://www.cosmobio.co.jp/product/uploads/document/PTB_REDIchip_reference_data_1.pdf", Protea Biosciences Inc., 2015.

* cited by examiner (a)

(b)

SAMPLE SUPPORT BODY, IONIZATION METHOD, AND MASS SPECTROMETRY METHOD

TECHNICAL FIELD

The present disclosure relates to a sample support body, an ionization method, and a mass spectrometry method.

BACKGROUND ART

Patent Literature 1 describes a sample target including a layer of aluminum and a layer of porous alumina provided on the layer of aluminum. In the sample target described in Patent Literature 1, a component of a sample is ionized by irradiating the layer of porous alumina on which the sample is disposed with laser light.

CITATION LIST

Patent Literature

Patent Literature 1: Japanese Patent No. 4885142

SUMMARY OF INVENTION

Technical Problem

In the sample target described in Patent Literature 1, the plurality of pores formed in the layer of porous alumina are not open to the aluminum layer side. Therefore, when a sample containing a liquid is disposed to one region in, for example, ionizing a component of the sample using each of a plurality of regions as a measurement region in the layer of porous alumina, the sample that has not been completely accommodated in the plurality of pores may flow out of the one region and spread to another region.

In this regard, an object of the present disclosure is to provide a sample support body capable of preventing a sample from spreading from one region to another region when a component of the sample is ionized in each of a plurality of regions and an ionization method and a mass spectrometry method using such the sample support body.

Solution to Problem

A sample support body of one aspect of the present disclosure is used for ionizing a component of a sample. The sample support body includes: a substrate; a porous layer provided on the substrate and having a front surface on a side opposite to the substrate; and a partition portion partitioning the front surface into a first region and a second region. The porous layer includes a main body layer having a plurality of holes opening to the front surface. The partition portion includes a partition groove formed on the front surface so as to pass between the first region and the second region.

In this sample support body, the partition portion partitioning the front surface of the porous layer into the first region and the second region includes the partition groove formed on the front surface of the porous layer so as to pass between the first region and the second region. As a result, when, for example, the liquid-containing sample is disposed to the first region, the partition portion prevents the sample that has not been completely accommodated in the plurality of holes from flowing out of the first region and spreading to the second region. Therefore, with this sample support body, it is possible to prevent the sample from spreading from the first region to the second region when the component of the sample is ionized in each of the first region and the second region.

In the sample support body of one aspect of the present disclosure, a width of the partition groove may be greater than a depth of the partition groove. According to this, it is possible to more reliably prevent the sample from spreading from the first region to the second region.

In the sample support body of one aspect of the present disclosure, the depth of the partition groove may be 50 μm or more and 300 μm or less, and the width of the partition groove may be at least twice the depth of the partition groove. According to this, it is possible to more reliably prevent the sample from spreading from the first region to the second region.

In the sample support body of one aspect of the present disclosure, the partition portion may include, as the partition groove, a part of an annular first partition groove surrounding the first region, a part of an annular second partition groove surrounding the second region, and a part of a third partition groove passing between the first partition groove and the second partition groove. According to this, it is possible to more reliably prevent the sample from spreading from the first region to the second region.

In the sample support body of one aspect of the present disclosure, the partition groove may extend annularly, the first region may be a region outside the partition groove, and the second region may be a region inside the partition groove. According to this, for example, the first region can be used for ionizing the component of the sample, and the second region can be used for mass calibration. In that case, by recognizing the partition groove, it is possible to easily recognize the range of presence of a reagent used for mass calibration, and it is possible to accurately irradiate the range of presence of the reagent with, for example, an energy ray.

The sample support body of one aspect of the present disclosure may further include a display portion where predetermined information is displayed, and the display portion may include a display groove formed on the front surface. According to this, the display portion can be formed by the same method as the partition groove, and the sample support body can be manufactured with high efficiency.

In the sample support body of one aspect of the present disclosure, the main body layer may be an insulating layer, and the porous layer may further include a conductive layer extending along at least the front surface. According to this, by irradiating the front surface of the porous layer, that is, the conductive layer with an energy ray, the component of the sample can be ionized with high efficiency.

In the sample support body of one aspect of the present disclosure, the main body layer may be an insulating layer, and the main body layer may be exposed to an outside on at least the front surface. According to this, the component of the sample can be ionized with high efficiency by irradiating the front surface of the porous layer, that is, the main body layer, which is an insulating layer, with charged droplets.

In the sample support body of one aspect of the present disclosure, the substrate and the main body layer may be formed by anodizing a surface layer of a metal substrate or a silicon substrate. According to this, a structure that enables high-efficiency ionization of the component of the sample can be obtained with ease and reliability.

In the sample support body of one aspect of the present disclosure, the partition groove may be formed on the front surface by the porous layer falling into a groove formed on a front surface of the substrate on the porous layer side.

According to this, the porous layer including the partition groove can be formed by, for example, anodizing the surface layer of a metal substrate or a silicon substrate after groove formation in the surface layer of the metal substrate or the silicon substrate. Therefore, it is possible to suppress damage to the porous layer in forming the partition groove as compared with, for example, when the porous layer is formed by anodizing the surface layer of the metal substrate or the silicon substrate and then the partition groove is formed on the front surface of the porous layer.

An ionization method of one aspect of the present disclosure includes: a step of preparing the above sample support body in which the porous layer includes the conductive layer; a step of disposing the sample to the front surface; and a step of ionizing the component by irradiating the front surface with an energy ray.

The component of the sample can be ionized with high efficiency by this ionization method.

An ionization method of one aspect of the present disclosure includes: a step of preparing the above sample support body in which the main body layer, which is an insulating layer, is exposed to the outside in the porous layer; a step of disposing the sample to the front surface; and a step of ionizing the component by irradiating the front surface with a charged droplet.

The component of the sample can be ionized with high efficiency by this ionization method.

A mass spectrometry method of one aspect of the present disclosure includes: the plurality of steps of the above ionization method; and a step of detecting the ionized component.

The component of the sample can be analyzed with high accuracy by this mass spectrometry method.

Advantageous Effects of Invention

According to the present disclosure, it is possible to provide a sample support body capable of preventing a sample from spreading from one region to another region the component of the sample is ionized in each of a plurality of regions and an ionization method and a mass spectrometry method using such the sample support body.

DESCRIPTION OF EMBODIMENTS

Figure 1:
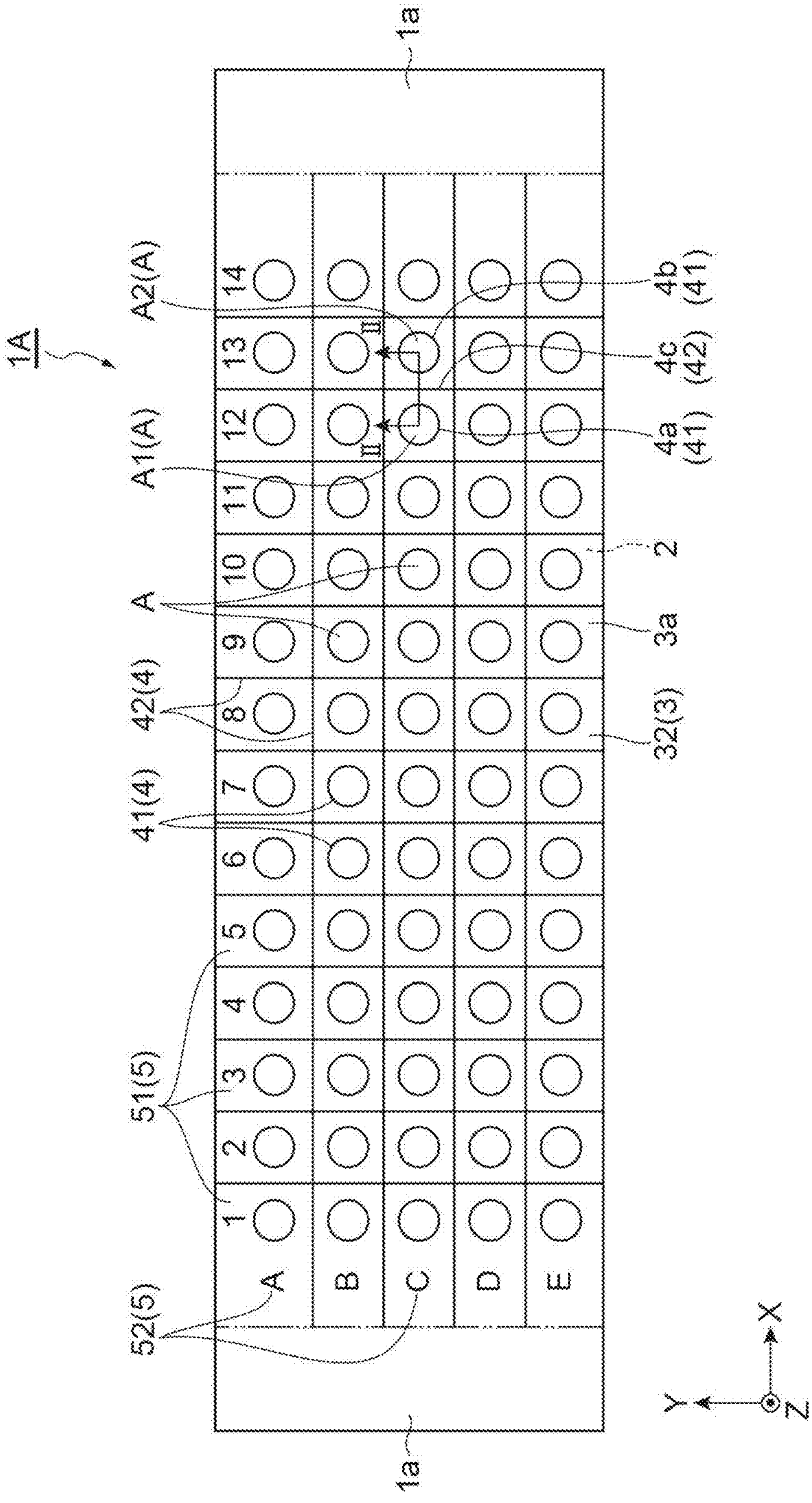
FIG. 1 is a plan view of a sample support body of a first embodiment.

Hereinafter, embodiments of the present disclosure will be described in detail with reference to the drawings. It should be noted that the same or corresponding parts in the drawings are denoted by the same reference numerals with redundant description omitted.

First Embodiment

Figure 2:
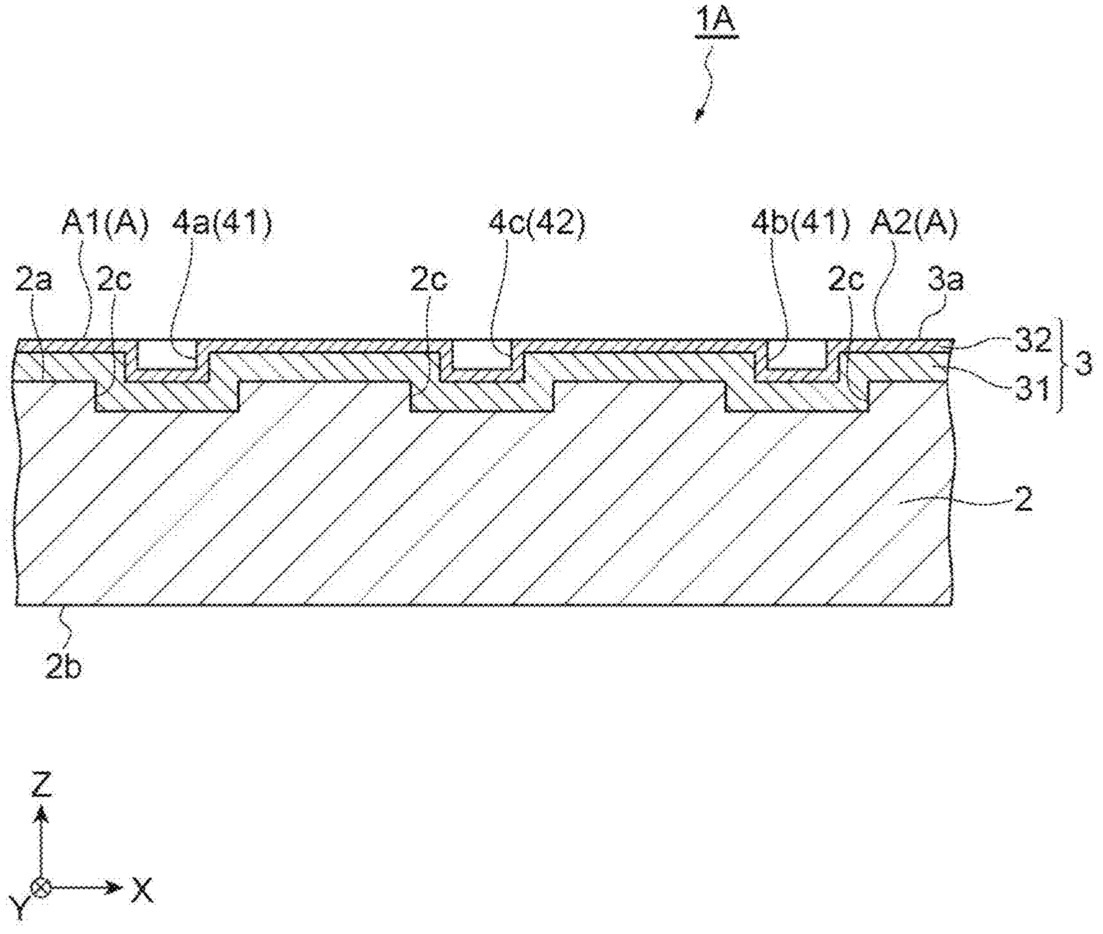
FIG. 2 is a cross-sectional view of the sample support body taken along line II-II illustrated in FIG. 1.

As illustrated in FIGS. 1 and 2, a sample support body 1A of a first embodiment includes a substrate 2 and a porous layer 3. The sample support body 1A is used for sample component ionization. In the following description, the thickness direction of the substrate 2 will be referred to as the Z-axis direction, one direction perpendicular to the Z-axis direction will be referred to as the X-axis direction, and the direction perpendicular to both the Z-axis direction and the X-axis direction will be referred to as the Y-axis direction.

The substrate 2 has a front surface 2*a* and a back surface 2*b* perpendicular to the Z-axis direction. The shape of the substrate 2 is, for example, a rectangular plate shape in which the length direction is the X-axis direction. The thickness of the substrate 2 is, for example, approximately 0.5 to 1 mm. The material of the substrate 2 is, for example, aluminum (Al).

The porous layer 3 is provided on the substrate 2. Specifically, the porous layer 3 is formed over the entire front surface 2*a* of the substrate 2. The porous layer 3 has a front surface 3*a* on the side opposite to the substrate 2. The porous layer 3 includes a main body layer 31, which is an insulating layer. The material of the main body layer 31 is, for example, alumina ($Al_2O_3$).

Figure 3:
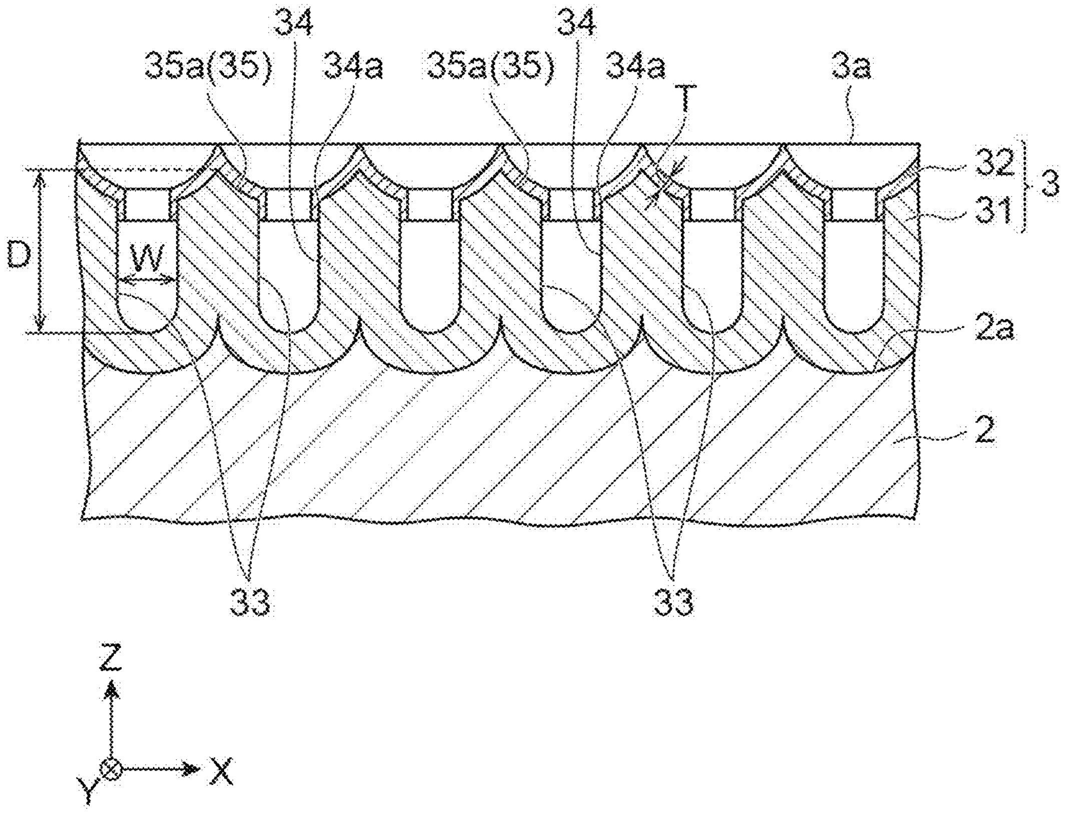
FIG. 3 is a cross-sectional view of a porous layer that is illustrated in FIG. 2.

As illustrated in FIG. 3, the main body layer 31 has a plurality of holes 33 opening to the front surface 3*a*. Each hole 33 includes an extending portion 34 and an opening portion 35. The extending portion 34 extends in the Z-axis direction. The extending portion 34 is, for example, circular when viewed in the Z-axis direction. The opening portion 35 is widened toward the front surface 3*a* from an end 34*a* of the extending portion 34 on the front surface 3*a* side. The shape of the opening portion 35 is, for example, a bowl shape or a truncated cone shape (tapered shape) expanding toward the front surface 3*a* from the end 34*a* of the extending portion 34. It should be noted that the end of the extending portion 34 on the substrate 2 side is positioned in the main body layer 31.

The porous layer 3 further includes a conductive layer 32. The conductive layer 32 is formed along at least the front surface 3*a* of the porous layer 3 and an inner surface 35*a* of each opening portion 35. In the sample support body 1A, the material of the conductive layer 32 is a metal that has low affinity (reactivity) with a sample and high conductivity. Examples of such metals include gold (Au), platinum (Pt), chromium (Cr), nickel (Ni), and titanium (Ti).

As illustrated in FIG. 1, both end portions 1*a* of the sample support body 1A in the X-axis direction (both end portions outside the two-dot chain lines in FIG. 1) function as held portions when, for example, the sample support body 1A is attached to a mass spectrometer. The region of the front surface 3*a* of the porous layer 3 between both end portions 1*a* functions as a measurement region. The region has, for example, a rectangular shape in which the length direction is the X-axis direction.

The sample support body 1A further includes a partition portion 4 and a display portion 5. The partition portion 4 partitions the region of the front surface 3*a* of the porous layer 3 between both end portions 1*a* into a plurality of regions A. Specifically, the partition portion 4 includes a plurality of partition grooves 41 extending in an annular shape (for example, circular ring shape) and a plurality of linearly extending partition grooves 42. The plurality of partition grooves 41 are arranged in, for example, a matrix shape. Each partition groove 41 defines the region A. Each partition groove 41 is formed on the front surface 3*a* of the porous layer 3 so as to pass between the regions A that are adjacent to each other.

The plurality of partition grooves 42 include a plurality of first parts extending along the X-axis direction and a plurality of second parts extending along the Y-axis direction. The first part of the partition groove 42 reaches both end portions 1*a*. The second part of the partition groove 42 reaches both ends of the porous layer 3 in the Y-axis direction. Each first part and each second part cross each other and are connected to each other. In other words, the plurality of partition grooves 42 extend in a grid shape. Each partition groove 42 is formed on the front surface 3*a* of the porous layer 3 so as to pass between the partition grooves 41 that are adjacent to each other.

The partition portion 4 will be described by focusing on the adjacent regions A (pair of regions A). In the present embodiment, as an example, one of the pair of regions A adjacent to each other in the X-axis direction will be referred to as a first region A1 and the other region A will be referred to as a second region A2. The partition portion 4 includes a first partition groove 4*a* (partition groove 41), a second partition groove 4*b* (partition groove 41), and a third partition groove 4*c* (partition groove 42). The first partition groove 4*a* surrounds the first region A1. The second partition groove 4*b* surrounds the second region A2. The third partition groove 4*c* passes between the first partition groove 4*a* and the second partition groove 4*b*. In this manner, the first partition groove 4*a*, the second partition groove 4*b*, and the third partition groove 4*c* pass between the first region A1 and the second region A2. The first region A1 and the second region A2 are partitioned by the first partition groove 4*a*, the second partition groove 4*b*, and the third partition groove 4*c*. It should be noted that the first region A1 and the second region A2 may be any pair of regions A adjacent to each other in the X-axis direction or any pair of regions A adjacent to each other in the Y-axis direction.

As illustrated in FIG. 2, the partition groove 41 is formed on the front surface 3*a* of the porous layer 3 by the porous layer 3 falling into a groove 2*c* formed on the front surface 2*a* of the substrate 2. Specifically, the porous layer 3 is continuously formed over the entire surface of the substrate 2 on the side opposite to the back surface 2*b* (the front surface 2*a* and the inner surface of the groove 2*c*). The thickness of the porous layer 3 formed on the front surface 2*a* of the substrate 2 and the thickness of the porous layer 3 formed in the groove 2*c* are approximately equal to each other. The partition groove 41 is formed by the front surface 3*a* of the porous layer 3 formed on the inner surface of the groove 2*c*.

The width of the partition groove 41 is greater than the depth of the partition groove 41. The depth of the partition groove 41 is 50 μm or more and 300 μm or less. In the present embodiment, the depth of the partition groove 41 is approximately 50 μm. The width of the partition groove 41 is at least twice the depth of the partition groove 41. The partition groove 41 can be recognized by a worker visually recognizing the partition groove 41. In other words, the partition groove 41 functions as a marking for recognizing each region A as well as a partition portion for partitioning between the adjacent regions A.

As in the case of the partition groove 41, the partition groove 42 is formed on the front surface 3*a* of the porous layer 3 by the porous layer 3 falling into the groove 2*c* formed on the front surface 2*a* of the substrate 2. The width of the partition groove 42 is greater than the depth of the partition groove 42. The depth of the partition groove 42 is 50 μm or more and 300 μm or less. In the present embodiment, the depth of the partition groove 42 is, for example, about 50 μm. The width of the partition groove 42 is at least twice the depth of the partition groove 42. The partition groove 42 can be recognized by a worker visually recognizing the partition groove 42. In other words, the partition groove 42 functions as a marking for recognizing each region A as well as a partition portion for partitioning between the adjacent regions A.

The depths of the partition grooves 41 and 42 are values acquired using a confocal laser microscope. The widths of the partition grooves 41 and 42 are values acquired from an image taken with a microscope.

As illustrated in FIG. 1, the display portion 5 includes a plurality of first display grooves 51 and a plurality of second display grooves 52. The plurality of first display grooves 51 are arranged along the X-axis direction. The plurality of first display grooves 51 are disposed on one side in the Y-axis direction with respect to the whole of the plurality of regions A. Each first display groove 51 corresponds to the column of the plurality of regions A arranged along the Y-axis direction. The first display groove 51 represents, for example, a number.

The plurality of second display grooves 52 are arranged along the Y-axis direction. The plurality of second display grooves 52 are disposed on one side in the X-axis direction with respect to the whole of the plurality of regions A. Each second display groove 52 corresponds to the row of the plurality of regions A arranged along the X-axis direction. The second display groove 52 represents, for example, an alphabet.

The first display groove 51 and the second display groove 52 are formed in the region of the front surface 3*a* of the porous layer 3 between both end portions 1*a* such that predetermined information is displayed. As in the case of the partition grooves 41 and 42, the first display groove 51 and the second display groove 52 are formed on the front surface 3*a* of the porous layer 3 by the porous layer 3 falling into the grooves that are formed on the front surface 2*a* of the substrate 2. In the sample support body 1A, the predetermined information is information for identifying each of the plurality of regions A. For example, when a sample is disposed in a predetermined region A, the predetermined region A can be identified by the combination of the first display groove 51 and the second display groove 52.

The dimensions of the porous layer 3 will be described. As illustrated in FIG. 3, the average value of depths D of the plurality of holes 33 is 3 μm or more and 100 μm or less. As an example, in the region A, the number of the holes 33 where the depth D is average value±10% is 60% or more of the total number of the holes 33 (preferably 70% or more, more preferably 80% or more). The average value of widths W of the plurality of holes 33 is 40 nm or more and 350 nm or less. As an example, in the region A, the number of the holes 33 where the width W is average value±10% is 60% or more of the total number of the holes 33 (preferably 70% or more, more preferably 80% or more). The value that is obtained by dividing the average value of the depths D by the average value of the widths W is 9 or more and 2500 or less. As an example, in the region A, the number of the holes 33 where "the value that is obtained by dividing the average value of the depths D by the average value of the widths W" is average value±10% is 60% or more of the total number of the holes 33 (preferably 70% or more, more preferably 80% or more). A thickness T of the conductive layer 32 is nm or more and 200 nm or less.

The average value of the depths D is a value acquired as follows. First, the sample support body 1A is prepared and the sample support body 1A is cut parallel to the Z-axis direction. Subsequently, an SEM image of one of the cut surfaces of the main body layer 31 is acquired. Subsequently, in the region corresponding to the region A, the average value of the depths D of the plurality of holes 33 is calculated to acquire the average value of the depths D.

The average value of the widths W is a value acquired as follows. First, the sample support body 1A is prepared and the sample support body 1A (specifically, the main body layer 31) is cut perpendicularly to the Z-axis direction so as to traverse the plurality of extending portions 34. Subsequently, an SEM image of one of the cut surfaces of the main body layer 31 is acquired. Subsequently, in the region corresponding to the region A, a plurality of pixel groups corresponding to the plurality of holes 33 (specifically, the plurality of extending portions 34) are extracted. This pixel group extraction is performed by, for example, performing binarization processing of the SEM image. Subsequently, the diameter of a circle that has the average value of the areas of the plurality of holes 33 (specifically, the plurality of extending portions 34) is calculated based on the plurality of pixel groups, and the diameter is acquired as the average value of the widths W.

The substrate 2 and the main body layer 31 are formed by anodizing the surface layer of a metal substrate. The substrate 2 and the main body layer 31 are formed by, for example, anodizing the surface layer of an Al substrate. It should be noted that examples of the metal substrate include a tantalum (Ta) substrate, a niobium (Nb) substrate, a titanium (Ti) substrate, a hafnium (Hf) substrate, a zirconium (Zr) substrate, a zinc (Zn) substrate, a tungsten (W) substrate, a bismuth (Bi) substrate, and an antimony (Sb) substrate as well as an Al substrate.

In the main body layer 31, the plurality of holes 33 each having the substantially constant width W are formed uniformly (with uniform distribution). The pitch (center line-to-center line distance) between the holes 33 that are adjacent to each other is, for example, approximately 275 nm. The aperture ratio of the plurality of holes 33 in the region A (ratio of the plurality of holes 33 to the region A when viewed in the Z-axis direction) is practically 10 to 80% and particularly preferably 60 to 80%. It should be noted that in the plurality of holes 33, the widths W of the holes 33 may be irregular or the holes 33 may be partially connected to each other.

A method for manufacturing the sample support body 1A will be described. First, as illustrated in (a) of FIG. 4, the substrate 2 is prepared and the grooves 2*c* for forming the partition portion 4 are formed on the front surface 2*a* of the substrate 2. At this time, grooves for forming the display portion 5 illustrated in FIG. 1 are also formed on the front surface 2*a* of the substrate 2. Etching, laser processing, machining, or the like as an example is used to form the grooves 2*c* for forming the partition portion 4 and the grooves for forming the display portion 5.

Figure 4:
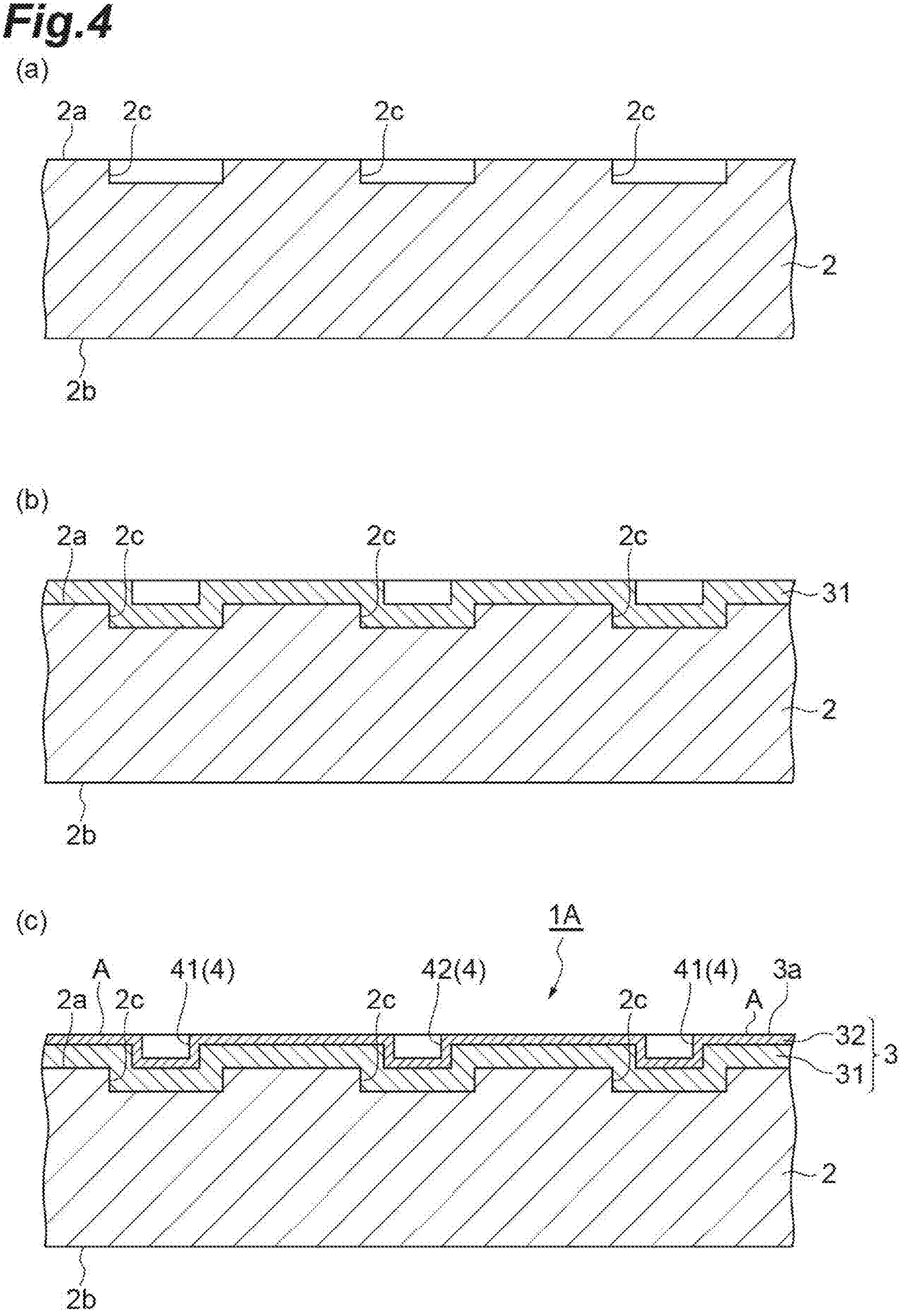
FIG. 4 is a diagram illustrating a step of manufacturing the sample support body that is illustrated in FIG. 2.

Subsequently, the main body layer 31 is formed on the front surface 2*a* of the substrate 2 as illustrated in (b) of FIG. 4. Subsequently, the conductive layer 32 is formed on the main body layer 31 as illustrated in (c) of FIG. 4. An evaporation method, a sputtering method, a plating method, atomic layer deposition (ALD), or the like as an example is used to form the conductive layer 32.

The sample support body 1A is obtained as a result of the above. In the method for manufacturing the sample support body 1A described above, the plurality of partition grooves 41 and the plurality of partition grooves 42 are formed on the front surface 3*a* of the porous layer 3 by the porous layer 3 falling into the grooves 2*c* for forming the partition portion 4. In addition, by the porous layer 3 falling into the grooves for forming the display portion 5, the plurality of first display grooves 51 and the plurality of second display grooves 52 illustrated in FIG. 1 are formed on the front surface 3*a* of the porous layer 3.

Formation of the main body layer 31 will be described. First, as illustrated in (a) FIG. 5, the substrate 2 is prepared and the surface layer of the substrate 2 is anodized to form an oxide layer 30 on the front surface 2*a* of the substrate 2. The oxide layer 30 has a plurality of holes 30*a* opening to the side opposite to the substrate 2.

Figure 5:
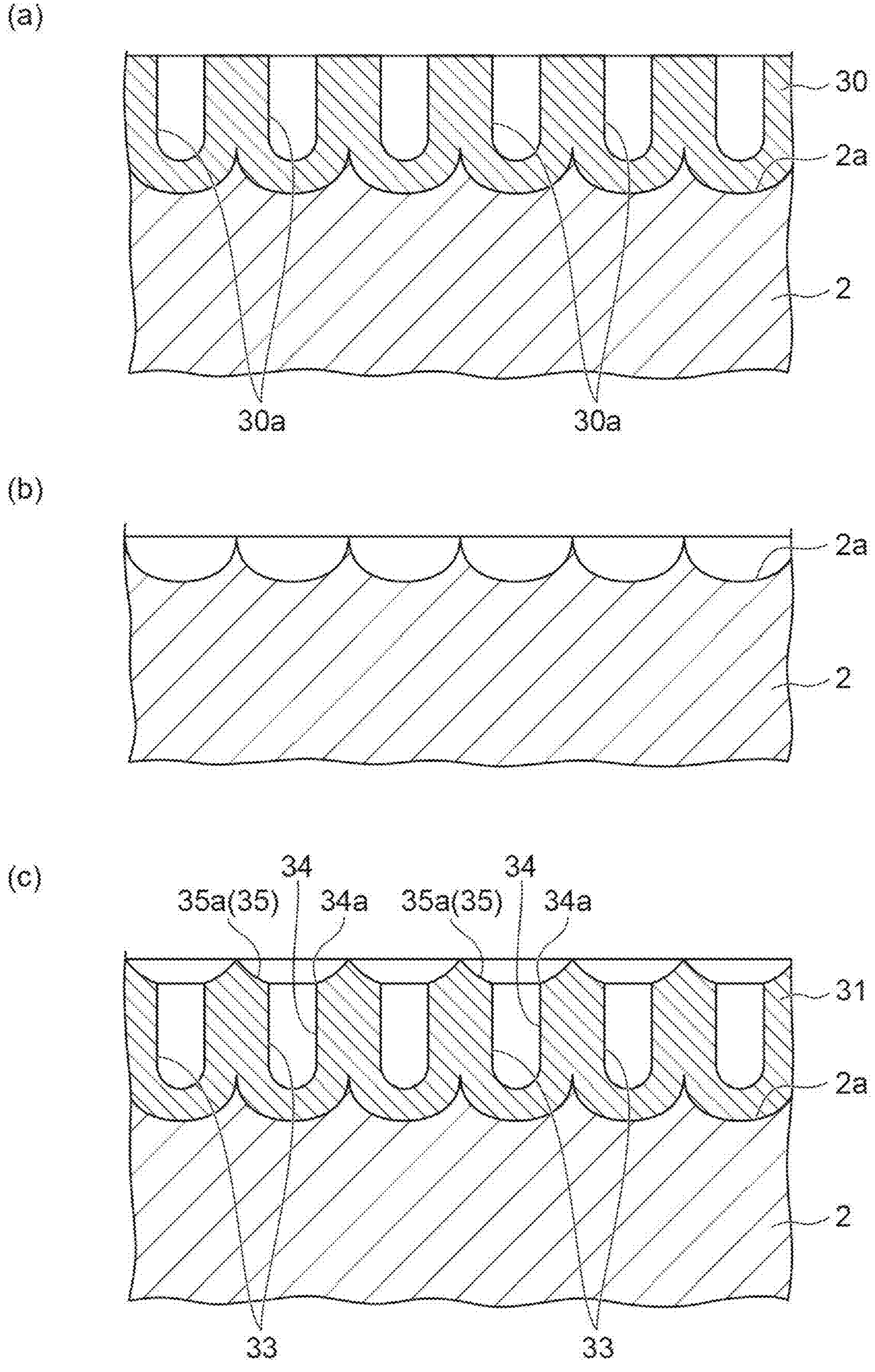
FIG. 5 is a diagram illustrating a step of forming a main body layer that is illustrated in FIG. 3.

Subsequently, as illustrated in (b) of FIG. 5, the oxide layer 30 is removed to expose the front surface 2*a* of the substrate 2 to the outside. A plurality of bowl-shaped or truncated cone-shaped (tapered) recessed portions are formed on the front surface 2*a* of the substrate 2. The plurality of recessed portions are formed at positions corresponding to the plurality of holes 30*a*.

Subsequently, as illustrated in (c) of FIG. 5, the surface layer of the substrate 2 is anodized again to form the main body layer 31 on the front surface 2*a* of the substrate 2. In the main body layer 31, each hole 33 includes the opening portion 35 widened from the end 34*a* of the extending portion 34 toward the side opposite to the substrate 2. The opening portion 35 is formed in each hole 33 by performing anodization in two stages as described above. In addition, by performing anodization in two stages, the regularity and uniformity of the arrangement and shapes of the plurality of holes 33 are improved. It should be noted that in forming the main body layer 31 described above, the substrate 2 is an Al substrate and the oxide layer 30 and the main body layer 31 are $Al_2O_3$ layers.

Figure 6:
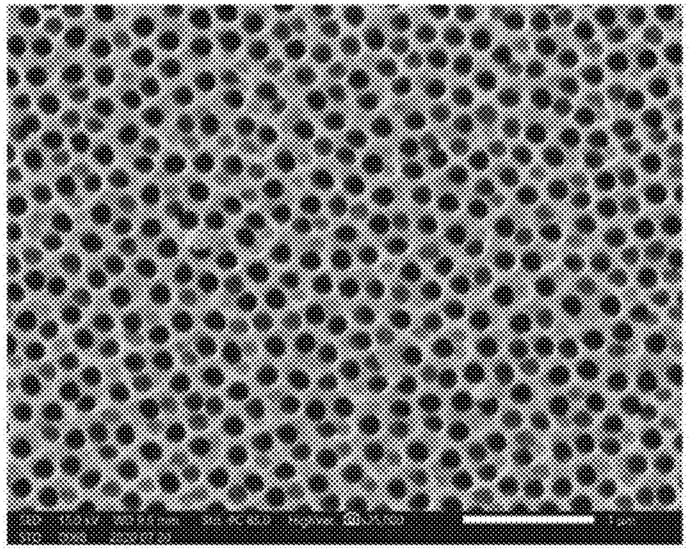
FIG. 6 is a diagram illustrating an SEM image of a front surface of the main body layer as an example.

FIG. 6 is a diagram illustrating an SEM image of the front surface of the main body layer 31 (front surface on the opening portion 35 side) as an example. The main body layer 31 illustrated in FIG. 6 was formed by anodizing the surface layer of an Al substrate in two stages. In the main body layer 31 illustrated in FIG. 6, the average value of the widths W of the plurality of holes 33 (black parts) is 110 nm, the average value of the depths D of the plurality of holes 33 is 10 μm, and the value obtained by dividing the average value of the depths D by the average value of the widths W is 91.

Figure 7:
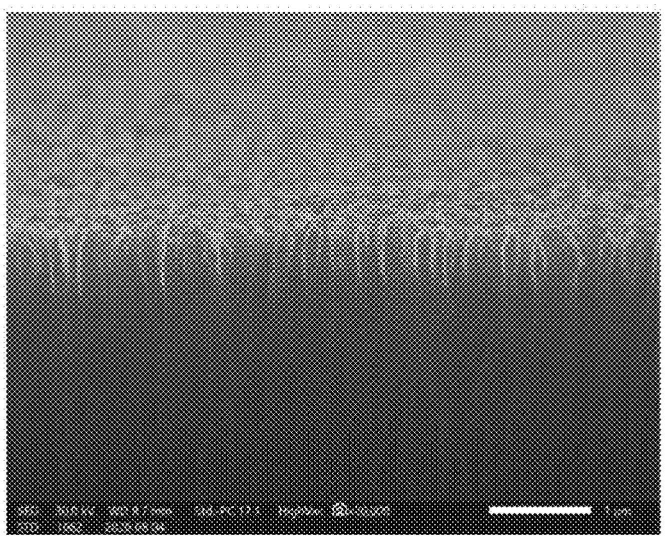
FIG. 7 is a diagram illustrating an SEM image of a cross section of the porous layer as an example.

FIG. 7 is a diagram illustrating an SEM image of a cross section (cross section parallel to the Z-axis direction) of the porous layer 3 as an example. The porous layer 3 illustrated in FIG. 7 was formed by performing Pt evaporation on the front surface of the main body layer 31 (front surface on the opening portion 35 side). Here, with the main body layer 31 rotating, the Pt evaporation was performed from a direction inclined by 30 degrees with respect to the direction perpendicular to the front surface of the main body layer 31. In the porous layer 3 illustrated in FIG. 7, the thickness T of the conductive layer 32 is 50 nm and the penetration amount of the conductive layer 32 (width of "the range of formation of the conductive layer 32" in the direction perpendicular to the front surface of the main body layer 31) is 506 nm. In the porous layer 3 illustrated in FIG. 7, each hole 33 includes the opening portion 35, and thus it is conceivable that a sufficient penetration amount of the conductive layer 32 is ensured with respect to the thickness T of the conductive layer 32.

Figure 8:
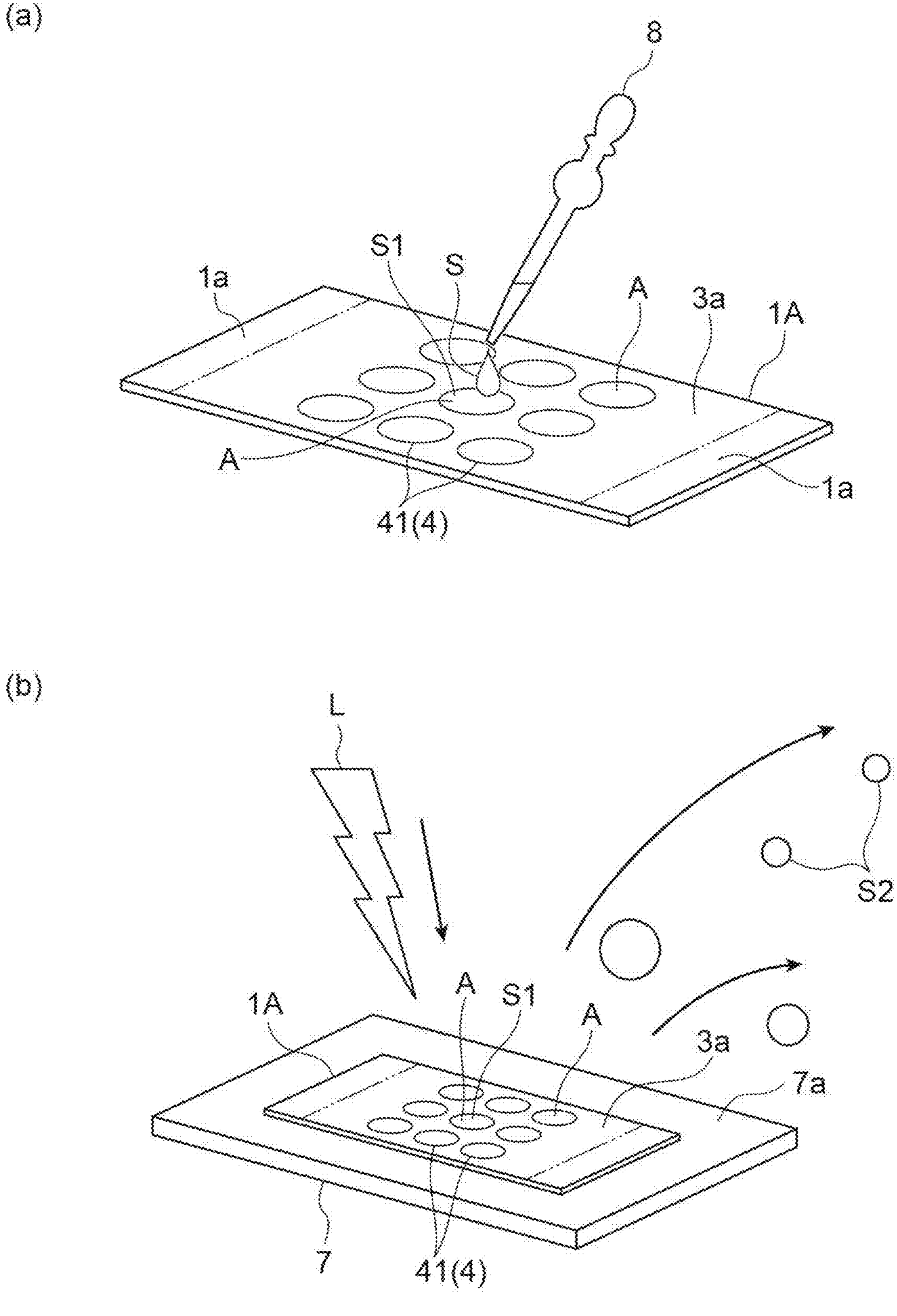
FIG. 8 is a diagram illustrating an ionization method and a mass spectrometry method using the sample support body that is illustrated in FIG. 1.

An ionization method and a mass spectrometry method using the sample support body 1A will be described. First, as illustrated in (a) of FIG. 8, the sample support body 1A is prepared (preparation step). It should be noted that the structure of the sample support body 1A illustrated in FIG. 8 is similar to the structure described with reference to FIGS. 1 to 7 although the sample support body 1A illustrated in FIG. 8 is different from the sample support body 1A illustrated in FIG. 1 in terms of the number of the regions A. In addition, in FIG. 8, the partition groove 42 and the display portion 5 are not illustrated. Subsequently, a sample S is disposed to the front surface 3*a* of the porous layer 3 of the sample support body 1A (disposition step). As an example, the sample S containing a liquid is dripped onto each region A with a pipette 8. As a result, a component S1 of the sample S moves from the front surface 3*a* side of the porous layer 3 to the substrate 2 side via the plurality of holes 33 and stays on the front surface 3*a* side due to, for example, surface tension.

Subsequently, with the component of the sample S introduced, the sample support body 1A is disposed on a placement surface 7*a* of slide glass 7 as illustrated in (b) of FIG. 8. The slide glass 7 is a glass substrate on which a transparent conductive film such as an indium tin oxide (ITO) film is formed, and the placement surface 7*a* is the front surface of the transparent conductive film. Subsequently, while applying a voltage to the conductive layer 32 (see FIG. 1) of the sample support body 1A, the region A of the front surface 3*a* of the porous layer 3 of the sample support body 1A where the sample S is disposed is irradiated with laser light (energy ray) L. As a result, the component S1 of the sample S disposed on the front surface 3*a* is ionized (ionization step). As an example, the component S1 of the sample S disposed on the front surface 3*a* is scanned with the laser light L. The above steps correspond to the ionization method using the sample support body 1A. An example of the ionization method described above is performed as surface-assisted laser desorption/ionization (SALDI).

Subsequently, sample ions (ionized components) S2 released as a result of the ionization of the component S1 of the sample S are detected in a mass spectrometer (detection step), and a mass spectrum of molecules constituting the sample S is acquired. As an example, the mass spectrometer is a scanning mass spectrometer using time-of-flight mass spectrometry (TOF-MS). The above steps correspond to the mass spectrometry method using the sample support body 1A.

As described above, in the sample support body 1A, the partition portion 4 partitioning the front surface 3*a* of the porous layer 3 into the first region A1 and the second region A2 includes the partition grooves 41 and 42 formed on the front surface 3*a* of the porous layer 3 so as to pass between the first region A1 and the second region A2. As a result, when, for example, the liquid-containing sample S is disposed in the first region A1, the partition portion 4 prevents the sample S that has not been completely accommodated in the plurality of holes 33 from flowing out of the first region A1 and spreading to the second region A2. Therefore, with the sample support body 1A, it is possible to prevent the sample S from spreading from the first region A1 to the second region A2 when the component S1 of the sample S is ionized in each of the plurality of regions A.

In the sample support body 1A, the width of the partition grooves 41 and 42 is greater than the depth of the partition grooves 41 and 42. As a result, it is possible to more reliably prevent the sample S from spreading from the first region A1 to the second region A2. In addition, the partition grooves 41 and 42 can be recognized more reliably, and the range of presence of the component S1 of the sample S can be recognized more reliably.

In the sample support body 1A, the depth of the partition grooves 41 and 42 is 50 μm or more and 300 μm or less, and the width of the partition grooves 41 and 42 is at least twice the depth of the partition grooves 41 and 42. As a result, it is possible to more reliably prevent the sample S from spreading from the first region A1 to the second region A2. In addition, the partition grooves 41 and 42 can be recognized more reliably, and the range of presence of the component S1 of the sample S can be recognized more reliably.

In the sample support body 1A, the partition portion 4 includes the annular first partition groove 4*a* surrounding the first region A1, the annular second partition groove 4*b* surrounding the second region A2, and the third partition groove 4*c* passing between the first partition groove 4*a* and the second partition groove 4*b*. As a result, it is possible to more reliably prevent the sample S from spreading from the first region A1 to the second region A2.

The sample support body 1A includes the display portion 5 where predetermined information is displayed. The display portion 5 includes the first display groove 51 and the second display groove 52 formed on the front surface 3*a*. As a result, the display portion 5 can be formed by the same method as the partition grooves 41 and 42, and the sample support body 1A can be manufactured with high efficiency.

In the sample support body 1A, the main body layer 31 is an insulating layer. The porous layer 3 includes the conductive layer 32 extending along at least the front surface 3*a*. As a result, by irradiating the front surface 3*a* of the porous layer 3, that is, the conductive layer 32 with the laser light L, the component S1 of the sample S can be ionized with high efficiency.

In the sample support body 1A, the substrate 2 and the main body layer 31 are formed by anodizing the surface layer of a metal substrate. As a result, a structure that enables high-efficiency ionization of the component S1 of the sample S can be obtained with ease and reliability.

In the sample support body 1A, the partition grooves 41 and 42 are formed on the front surface 3*a* by the porous layer 3 falling into the grooves 2*c* formed on the front surface 2*a* of the substrate 2 on the porous layer 3 side. As a result, the porous layer 3 including the partition grooves 41 and 42 can be formed by, for example, anodizing the surface layer of the metal substrate after groove formation in the surface layer of the metal substrate. Therefore, it is possible to suppress damage to the porous layer in forming the partition groove as compared with, for example, when the porous layer is formed by anodizing the surface layer of the metal substrate and then the partition groove is formed on the front surface of the porous layer.

The component S1 of the sample S can be ionized with high efficiency by the ionization method using the sample support body 1A. The component S1 of the sample S can be analyzed with high accuracy by the mass spectrometry method using the sample support body 1A. [Second Embodiment] A sample support body 1B illustrated in FIG. 9 is different from the sample support body 1A described above in that the partition portion 4 includes only one partition groove 41 and the display portion 5 includes a plurality of third display grooves 53 instead of the plurality of first display grooves 51 and the plurality of second display grooves 52.

Figure 9:
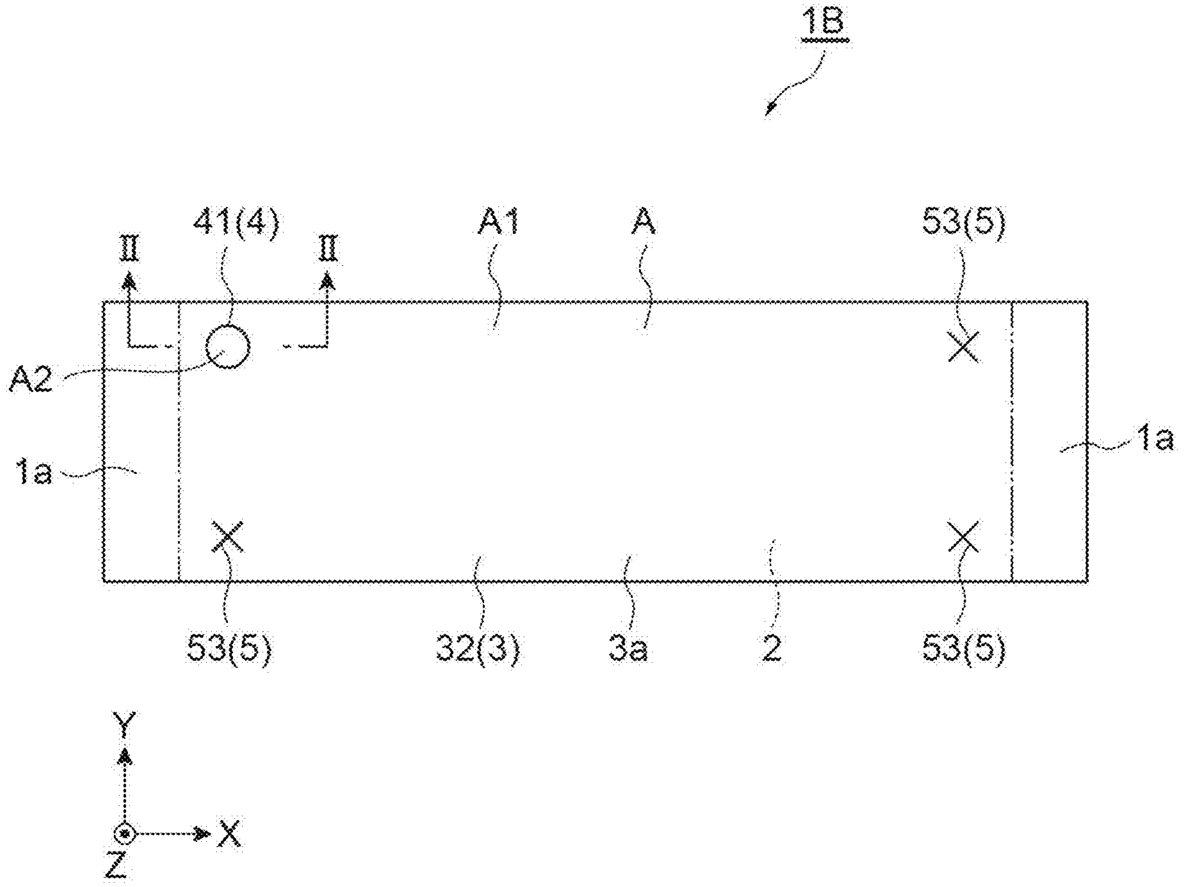
FIG. 9 is a plan view of a sample support body of a second embodiment.

As illustrated in FIG. 9, in the sample support body 1B, the region A is the entire region of the front surface 3*a* of the porous layer 3 between both end portions 1*a*. The partition groove 41 is disposed in, for example, one corner portion of the region A. The third display grooves 53 are respectively disposed in, for example, three corner portions of the region A (three corner portions where the partition groove 41 is not disposed).

The partition groove 41 is formed on the front surface 3*a* of the porous layer 3 so as to pass between the first region A1 and the second region A2. The first region A1 is the region of the region A outside the partition groove 41. The second region A2 is the region of the region A inside the partition groove 41. The second region A2 is, for example, where a reagent used for mass calibration is dripped. The partition portion 4 partitions the region A into the first region A1 and the second region A2.

Each third display groove 53 extends in an X shape. The third display groove 53 is formed on the front surface 3*a* of the porous layer 3 such that predetermined information is displayed. As in the case of the partition groove 41, the third display groove 53 is formed on the front surface 3*a* of the porous layer 3 by the porous layer 3 falling into the groove 2*c* formed on the front surface 2*a* of the substrate 2. In the sample support body 1B, the predetermined information is information on the position and angle of the sample support body 1B in attaching the sample support body 1B to a mass spectrometer, and the predetermined information is used to, for example, align the sample support body 1B in attaching the sample support body 1B to the mass spectrometer. The sample support body 1B can be manufactured by the same manufacturing method as the sample support body 1A.

An ionization method and a mass spectrometry method using the sample support body 1B will be described. First, as illustrated in (a) of FIG. 10, the sample support body 1B is prepared (preparation step). Subsequently, the sample S is disposed on the front surface 3*a* of the porous layer 3 of the sample support body 1B (disposition step). As an example, the first region A1 of the front surface 3*a* is pressed against the sample S to transfer a component of the sample S to the first region A1 of the front surface 3*a*.

Figure 10:
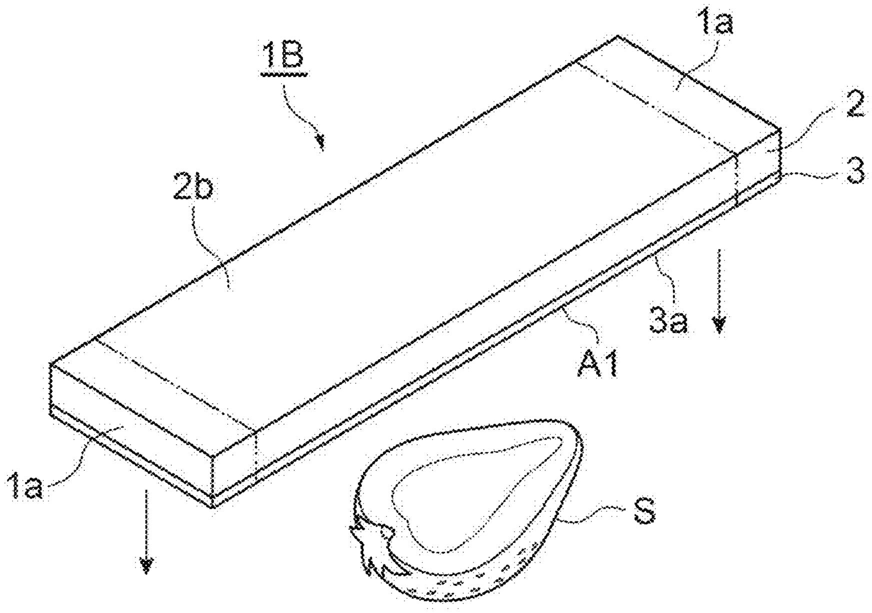
FIG. 10 is a diagram illustrating an ionization method and a mass spectrometry method using the sample support body that is illustrated in FIG. 9.
Figure 10:
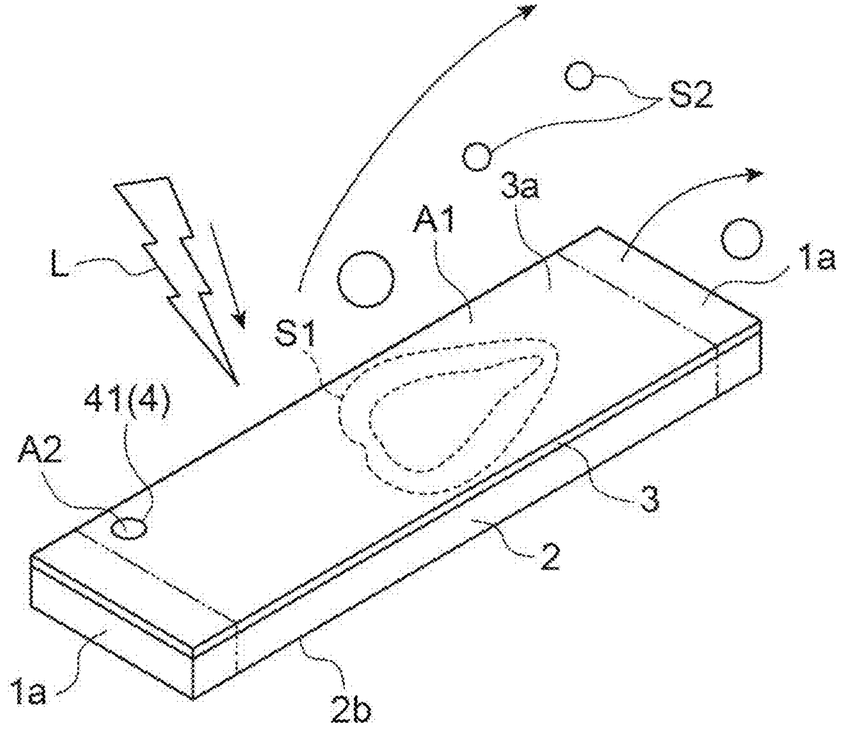

Subsequently, the sample support body 1B is attached to the mass spectrometer, and the component S1 of the sample S disposed on the front surface 3*a* is ionized as illustrated in (b) of FIG. 10 and in the same manner as the ionization method using the sample support body 1A (ionization step). The above steps correspond to the ionization method using the sample support body 1B. Subsequently, the sample ions (ionized components) S2 released as a result of the ionization of the component S1 of the sample S are detected in the mass spectrometer (detection step), and imaging mass spectrometry is performed to image the two-dimensional distribution of molecules constituting the sample S. The above steps correspond to the mass spectrometry method using the sample support body 1B.

As described above, the partition groove 41 annularly extends in the sample support body 1B. The first region A1 is a region outside the partition groove 41, and the second region A2 is a region inside the partition groove 41. As a result, the first region A1 can be used for ionizing the component S1 of the sample S, and the second region A2 can be used for mass calibration. In addition, by recognizing the partition groove 41, it is possible to easily recognize the range of presence of a reagent used for mass calibration, and it is possible to highly accurately irradiate the range of presence of the reagent with, for example, the laser light L.

MODIFICATION EXAMPLES

The present disclosure is not limited to the embodiments described above. For example, the partition portion 4 may partition the front surface 3*a* of the porous layer 3 into at least two regions. The partition portion 4 may, for example, include only one partition groove that traverses the front surface 3*a* of the porous layer 3. In that case, one side of the front surface 3*a* with respect to the partition groove is the first region A1, and the other side of the front surface 3*a* with respect to the partition groove is the second region A2.

The partition portion 4 may not completely partition the entire front surface 3*a*. For example, in the sample support body 1A, the partition portion 4 may include only a part of the first partition groove 4*a* on the second partition groove 4*b* side, a part of the second partition groove 4*b* on the first partition groove 4*a* side, and a part of the third partition groove 4*c* passing between the first partition groove 4*a* and the second partition groove 4*b*. For example, the partition portion 4 may include a partition groove that traverses only a part of the front surface 3*a* of the porous layer 3. In that case, one side of the front surface 3*a* with respect to the partition groove is the first region A1, and the other side of the front surface 3*a* with respect to the partition groove is the second region A2.

The partition portion 4 of the sample support body 1A may not include at least one of the first part and the second part of the partition groove 42. In that case, it is preferable that the depth of the partition groove 41 is 100 μm or more.

The porous layer 3 may not include the conductive layer 32. The main body layer 31, which is an insulating layer, may be exposed to the outside on at least the front surface 3*a* of the porous layer 3 and the inner surface 35*a* of each opening portion 35. In that case, the component S1 of the sample S can be ionized with high efficiency by irradiating the front surface 3*a* of the porous layer 3, that is, the main body layer 31, which is an insulating layer, with charged droplets.

Ionization and mass spectrometry methods using the sample support body 1A, 1B in which the porous layer 3 does not include the conductive layer 32 are as follows. First, the sample support body 1A, 1B is prepared (preparation step). Subsequently, the sample S is disposed to the front surface 3*a* of the porous layer 3 of the sample support body 1A, 1B (that is, the front surface of the main body layer 31) (disposition step). Subsequently, the component S1 of the sample S is ionized by irradiating the front surface 3*a* of the porous layer 3 of the sample support body 1A, 1B with charged droplets in a mass spectrometer (ionization step). As an example, the component S1 of the sample S disposed to the front surface 3*a* is scanned with charged droplets. The above steps correspond to the ionization method using the sample support body 1A, 1B. An example of the ionization method described above is performed as desorption electrospray ionization (DESI). Subsequently, the sample ions S2 released as a result of the ionization of the component S1 of the sample S are detected in the mass spectrometer (detection step), and mass spectrometry of molecules constituting the sample S is performed. The above steps correspond to the mass spectrometry method using the sample support body 1A, 1B.

In both the sample support body 1A and the sample support body 1B, the average value of the widths W may not be 40 nm or more and 350 nm or less insofar as the average value of the depths D of the plurality of holes 33 is 3 μm or more and 100 μm or less and the value obtained by dividing the average value of the depths D by the average value of the widths W of the plurality of holes 33 is 9 or more and 2500 or less. In that case, the thickness T of the conductive layer 32 may not be 10 nm or more and 200 nm or less when the porous layer 3 includes the conductive layer 32.

In the sample support body 1A, 1B in which the porous layer 3 includes the conductive layer 32, the conductive layer 32 may reach the inner surface of the extending portion 34 in each hole 33.

The main body layer 31 may be a conductive layer (for example, a metal layer or the like). In that case, the conductive layer 32 can be omitted in the porous layer 3.

The substrate 2 and the main body layer 31 may be formed by anodizing the surface layer of a silicon (Si) substrate.

In ionization using the sample support body 1A, 1B in which the porous layer 3 includes the conductive layer 32, the front surface 3*a* of the porous layer 3 of the sample support body 1A, 1B may be irradiated with an energy ray other than the laser light L (for example, an ion beam, an electron beam, or the like).

Figure 11:
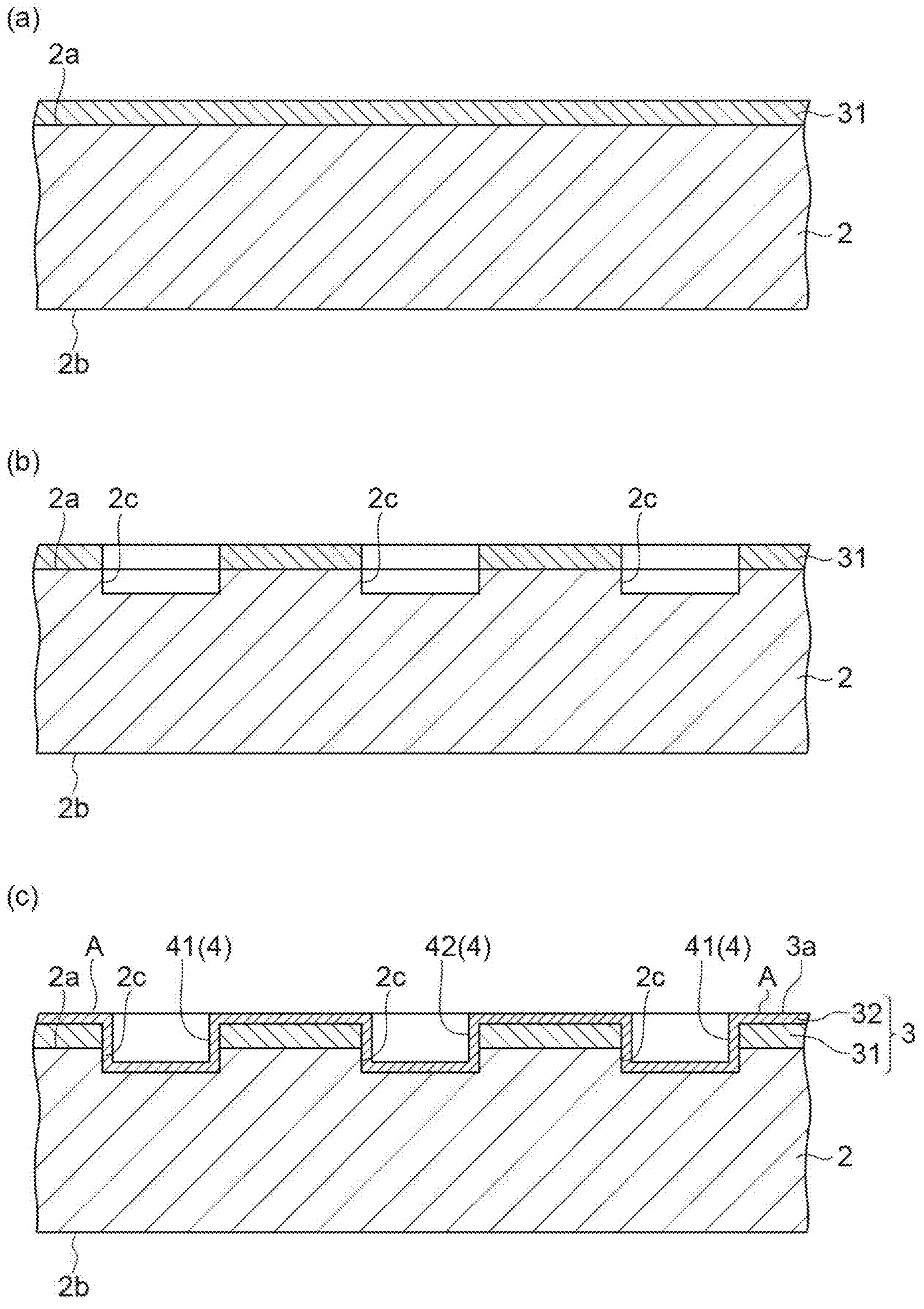
FIG. 11 is a diagram illustrating a step of manufacturing a sample support body of a modification example.

The partition portion 4 may be formed as follows. First, as illustrated in (a) of FIG. 11, the substrate 2 is prepared and the main body layer 31 is formed on the front surface 2*a* of the substrate 2. Subsequently, as illustrated in (b) of FIG. 11, the groove 2*c* that reaches the substrate 2 is formed on the main body layer 31. Subsequently, as illustrated in (c) of FIG. 11, the conductive layer 32 is formed on the main body layer 31. At this time, the conductive layer 32 is formed on the inner surface of the groove 2*c* as well. The sample support body 1A is obtained as a result of the above. It should be noted that the display portion 5 may also be formed in the same manner as this partition portion 4. The partition portion 4 and the display portion 5 of the sample support body 1B may also be formed in the same manner as this partition portion 4.

REFERENCE SIGNS LIST

1A, 1B: sample support body, 2: substrate, 3: porous layer, 3*a*: front surface, 31: main body layer, 32: conductive layer, 33: hole, 4: partition portion, 41, 42: partition groove, 4*a*: first partition groove, 4*b*: second partition groove, 4*c*: third partition groove, 5: display portion, 51: first display groove, 52: second display groove, 53: third display groove, A1: first region, A2: second region, L: laser light (energy ray), S: sample, S1: component, S2: sample ion (ionized component).

The invention claimed is:

1. A sample support body used for ionizing a component of a sample, the sample support body comprising:

a substrate;

a porous layer provided on the substrate and having a front surface on a side opposite to the substrate; and a partition portion partitioning the front surface into a first region and a second region, wherein the porous layer includes a main body layer having a plurality of holes opening to the front surface, and the partition portion includes a partition groove formed on the front surface so as to pass between the first region and the second region.

2. The sample support body according to claim 1, wherein a width of the partition groove is greater than a depth of the partition groove.

3. The sample support body according to claim 2, wherein the depth of the partition groove is 50 μm or more and 300 μm or less, and the width of the partition groove is at least twice the depth of the partition groove.

4. The sample support body according to claim 1, wherein the partition portion includes, as the partition groove, a part of an annular first partition groove surrounding the first region, a part of an annular second partition groove surrounding the second region, and a part of a third partition groove passing between the first partition groove and the second partition groove.

5. The sample support body according to claim 1, wherein the partition groove extends annularly, the first region is a region outside the partition groove, and the second region is a region inside the partition groove.

6. The sample support body according to claim 1, further comprising a display portion where predetermined information is displayed, wherein the display portion includes a display groove formed on the front surface.

7. The sample support body according to claim 1, wherein the main body layer is an insulating layer, and the porous layer further includes a conductive layer formed along at least the front surface.

8. The sample support body according to claim 7, wherein the substrate and the main body layer are formed by anodizing a surface layer of a metal substrate or a silicon substrate.

9. An ionization method comprising:

a step of preparing the sample support body according to claim 7;

a step of disposing the sample to the front surface; and a step of ionizing the component by irradiating the front surface with an energy ray.

10. A mass spectrometry method comprising:

the plurality of steps of the ionization method according to claim 9; and a step of detecting the ionized component.

11. The sample support body according to claim 1, wherein the main body layer is an insulating layer, and the main body layer is exposed to an outside on at least the front surface.

12. An ionization method comprising:

a step of preparing the sample support body according to claim 11;

a step of disposing the sample to the front surface; and a step of ionizing the component by irradiating the front surface with a charged droplet.

13. The sample support body according to claim 11, wherein the substrate and the main body layer are formed by anodizing a surface layer of a metal substrate or a silicon substrate.

14. The sample support body according to claim 1, wherein the partition groove is formed on the front surface by the porous layer falling into a groove formed on a front surface of the substrate on the porous layer side.

* * * * *